Evans & Gentsch,
Skate.
No. 3,806. Reissued Jan. 25. 1870.
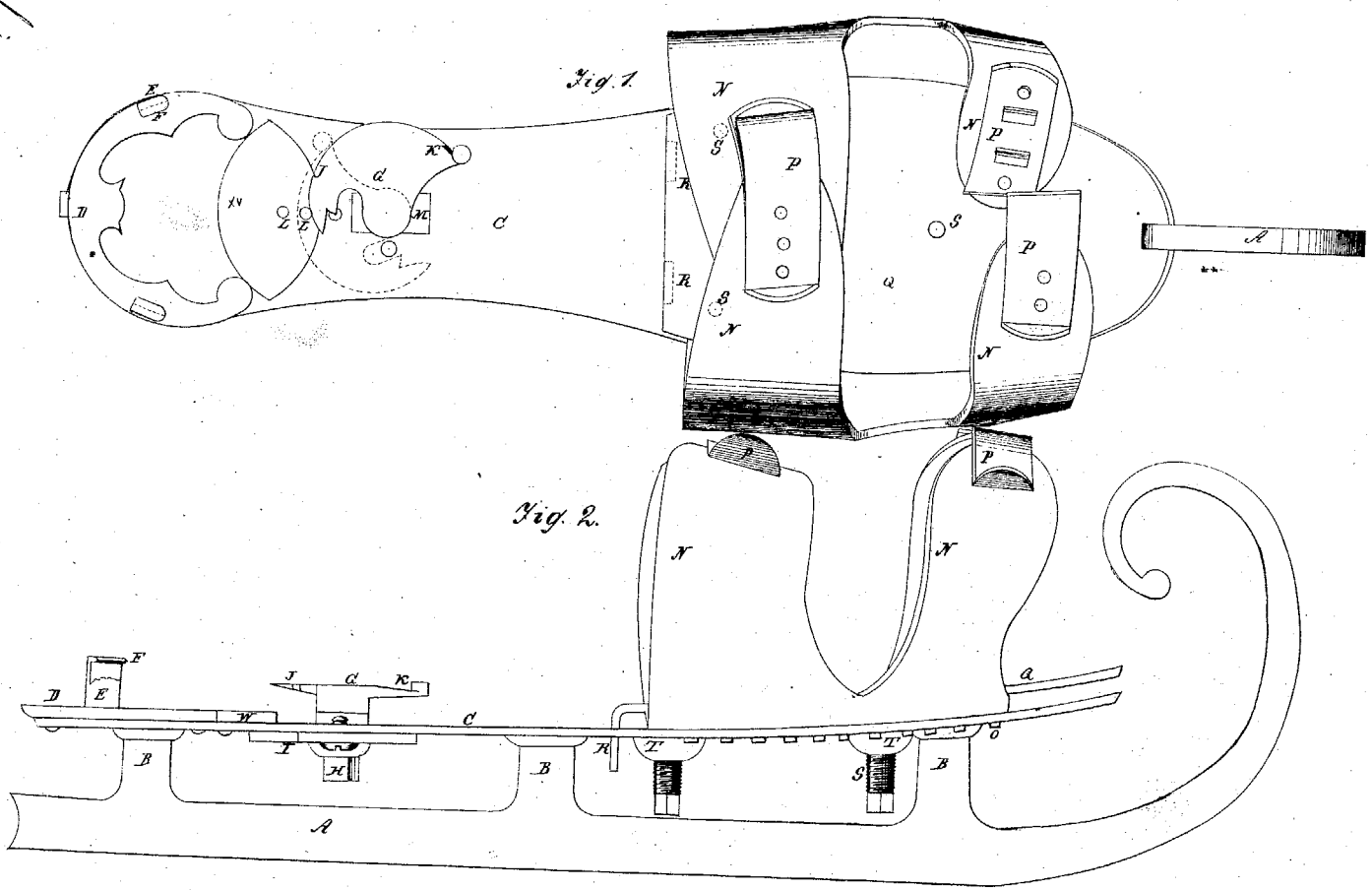
Witnesses:
Edward Lyon
James Hunter
Hasham Scott
Assgn
N. PETERS, PHOTO-LITHOGRAPHER, WASHINGTON, D. C.

United States Patent Office.

HARSHAW SCOTT, OF NEW YORK, N. Y., ASSIGNEE, BY MESNE ASSIGNMENTS, OF STOCKTON H. EVANS AND LUDWIG GENTSCH.

*Letters Patent No.* 18,685, *dated November* 24, 1857; *reissue No.* 3,806, *dated January* 25, 1870.

IMPROVEMENT IN SKATES.

The Schedule referred to in these Letters Patent and making part of the same.

*To all whom it may concern:*

Be it known that STOCKTON H. EVANS and LUDWIG GENTSCH, of the city and county of Philadelphia, and State of Pennsylvania, have invented certain new and useful Improvements in Skates; and the following is hereby declared to be a full, clear, and exact description thereof, reference being had to the accompanying drawings, making part of this specification, in which—

Figure 1 is a plan or top view of a skate, made according to said improvements.

Figure 2 is an elevation of the same.

The nature of this invention in skates consists in the employment of side-clamps containing spurs, or inwardly-projecting edges upon the skate, for clamping or catching, and firmly gripping the boot or shoe, in combination with a clamp, made so as to press and operate against the front of the heel, and push it against the other clamps, and lock it down to the skate; also, in placing an adjustable plate over the fore part of the skate, which is provided with set-screws, so as to raise and lower said plate, to tighten or adjust the straps which cross the top of the foot, to secure the skate upon it.

The accompanying drawings will serve to illustrate the general principles of the invention.

A is the runner of the skate, provided with standards, B B, to support the foot or sole-plate C.

The heel-plate D is fastened to the foot or sole-plate C, and provided with two side-clamps, E E, having sharp spurs, or inwardly-projecting edges, F F, for more firmly retaining a hold on to the boot or shoe to be fastened to the skate.

The clamp G is provided with a stud or shaft, H, fitted to the plate I, so as to turn freely in it. This clamp G is made gradually larger from J to K, and it also inclines gradually in the same direction toward the foot-plate C, so that when the heel of the boot or shoe is put in between the side-clamps, and a wrench put on the lower end of the shaft of this rotating clamp, which is made square for that purpose, and the clamp turned toward the heel, it will press the heel against said edges of the other clamps, and make a slight score in the front of the heel; and as it inclines toward the foot or sole-plate, it draws the heel down, and clamps it firmly against the plate and edges of the other clamps, so as to fasten it firmly to the skate.

There is a knob at K, on the extreme end of the clamp G, to come against the front of the heel, and stop the clamp, so as to prevent it from being turned too far.

The plate I is provided with slots, for the screws which fasten it to the plate C. It also has a stud in it, which may be put into either of the holes L L, so as to adjust or adapt the clamp to the size of the heel to be fastened; the foot-plate C having a slot, M, in it, which allows the clamp-shaft H to be moved, when required.

To fasten the fore part of the foot to the skate, the straps N N are riveted to the foot or sole-plate C, as shown at O O, and provided with clasps, P P, to connect them over the foot.

To tighten the straps N N, the top plate Q is made in the shape of the fore part of the plate C, and placed right over it, (the plate C,) and provided with two lugs, R R, which pass freely through holes made for them in the plate C, as the plate Q is raised or lowered vertically by the screws S S S, which turn in the female screws in the bushings T T, fastened in the plate C.

There is a small pivot on the end of the screws S S, fitted to holes in the plate Q, so as to aid in holding it right over the plate C, when the screws are turned to tighten or loosen the straps, and adjust the skate upon the boot.

To prevent the clamp G from injuring the front of the heel, a piece of leather, W, can be fastened to the plate C, between the ends of the heel-plate D, for the front part of the bottom of the heel to rest upon and be clamped against.

*Claims.*

1. The combination of a clamp, operating directly in front of the heel, with side clamps E E, containing inwardly-projecting edges, substantially as and for the purpose set forth.

2. The clamp directly in front of the heel, capable of adjustment to the size of heel, substantially described.

3. The arrangement of a vertically-adjustable plate over the fore part of the skate, substantially as and for the purpose set forth.

HARSHAW SCOTT.

Witnesses:

EDWARD LYON, Jr.,

JAMES HUNTER.